July 25, 1961 W. N. MILLER, JR., ET AL 2,993,289
BILLBOARD CONSTRUCTION
Filed April 7, 1958 5 Sheets-Sheet 4
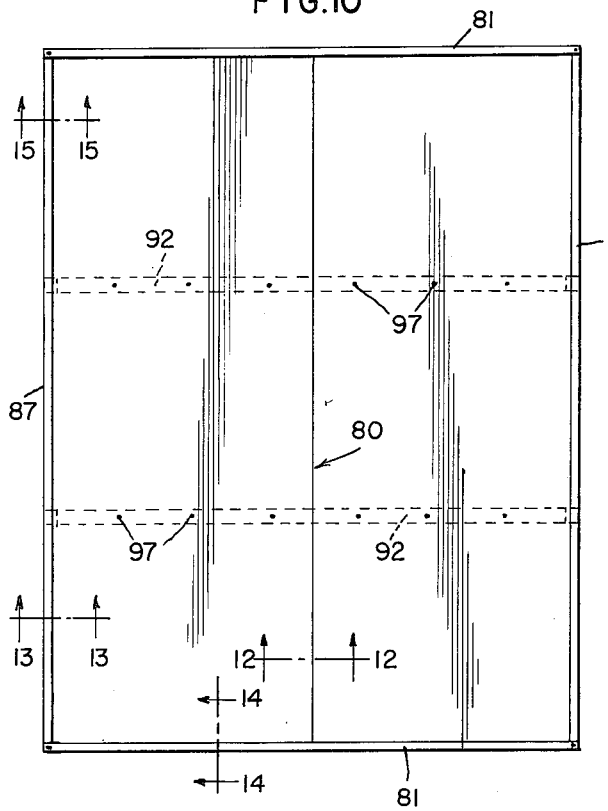
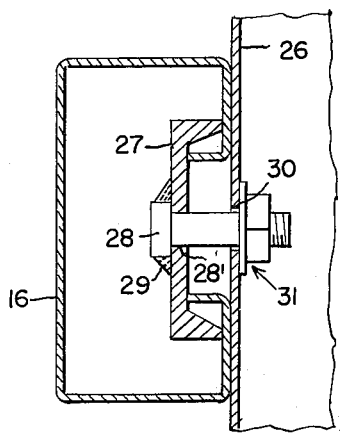
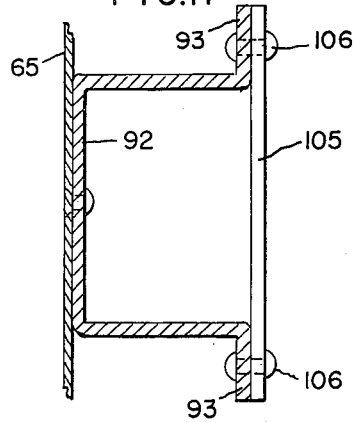
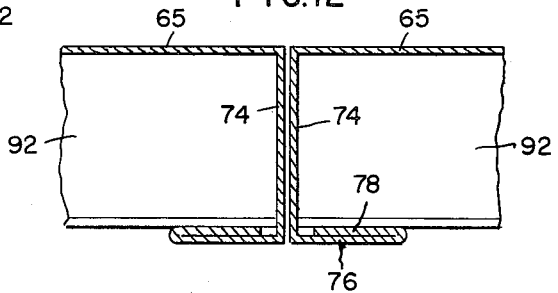
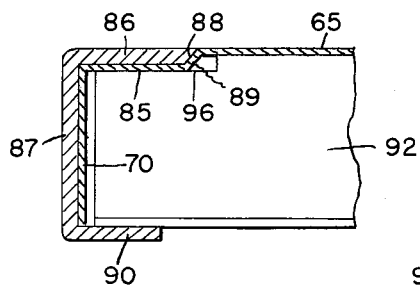
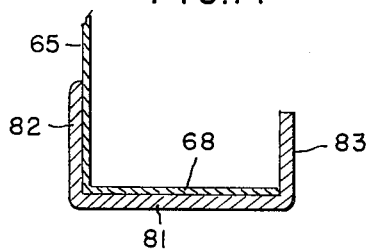
INVENTORS
William N. Miller, Jr.
BY Vardry D. Ramseur, Jr.
Shoemaker & Mattare
ATTYS.

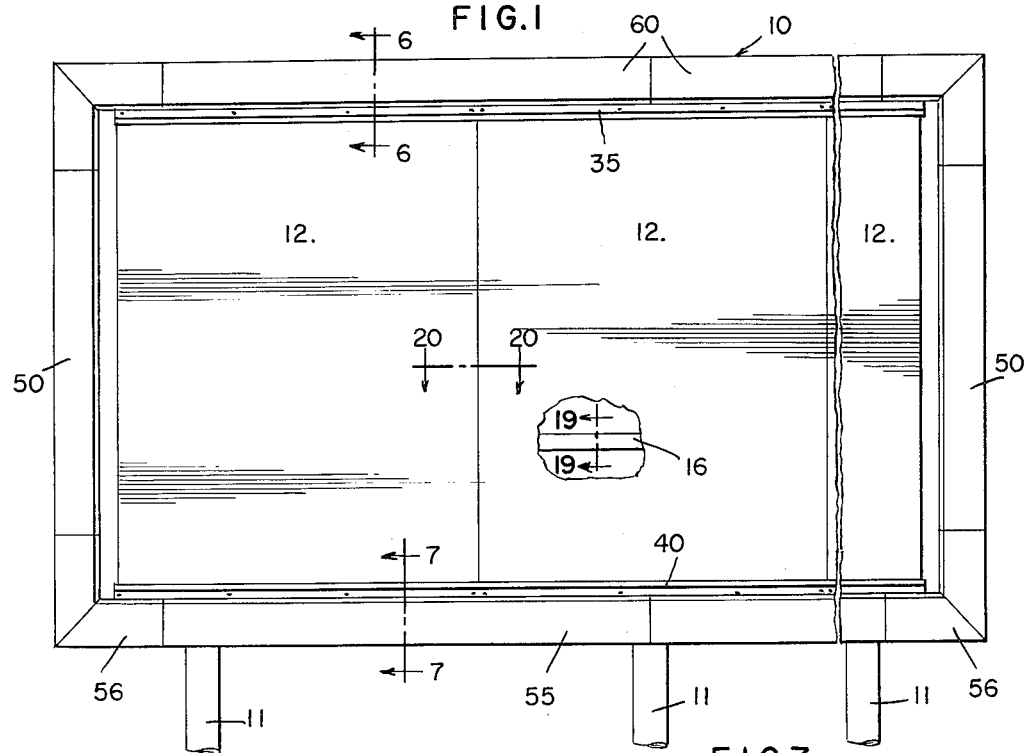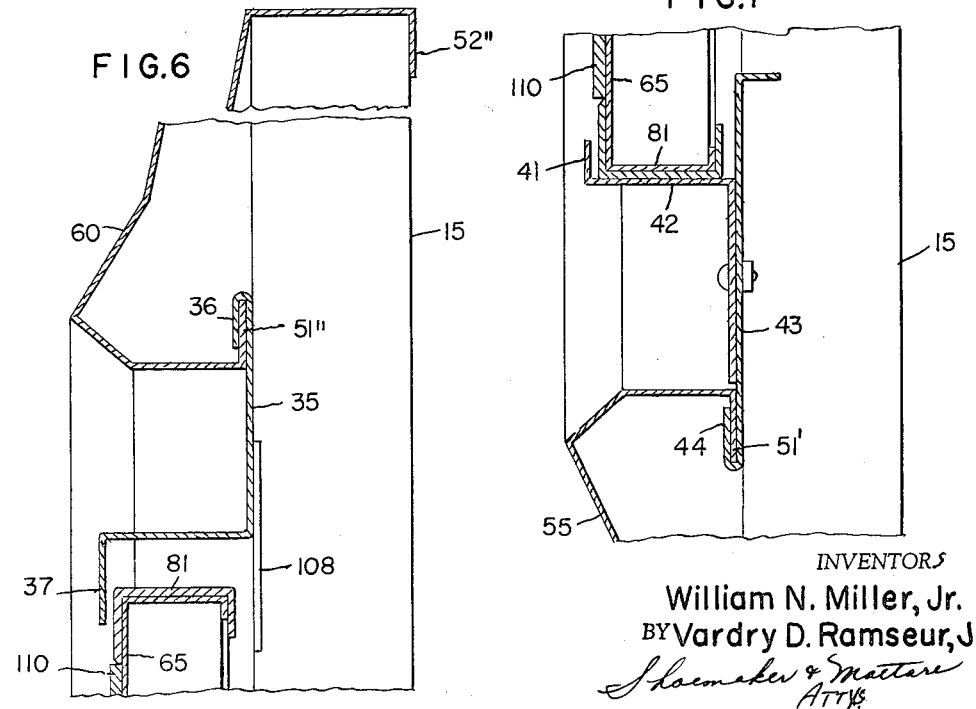

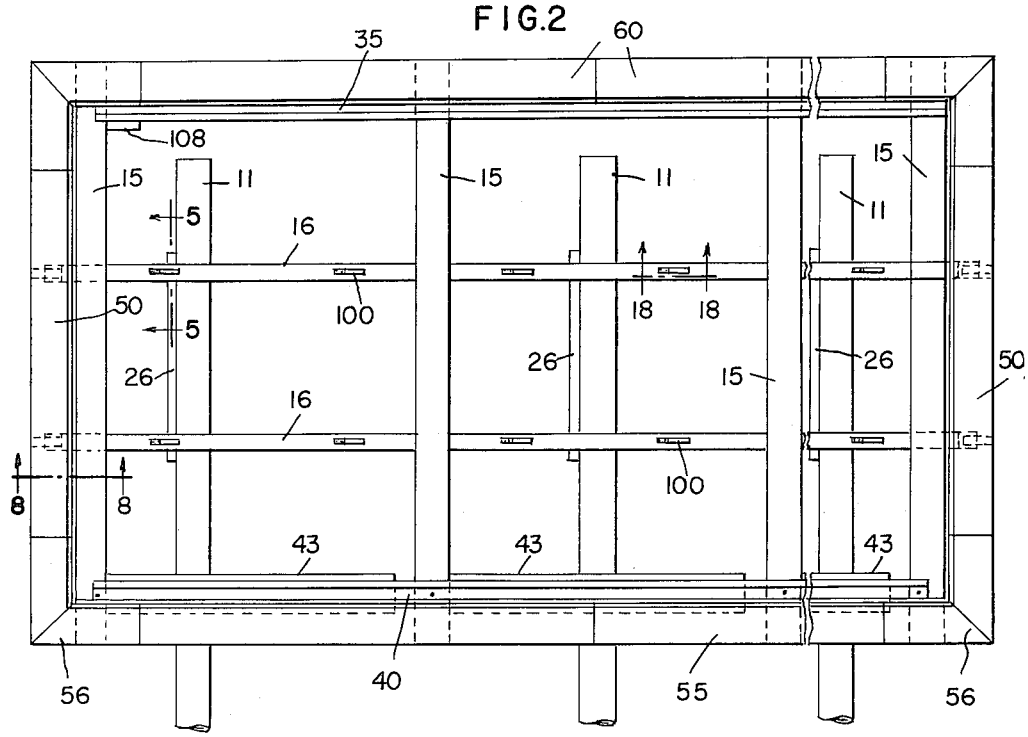
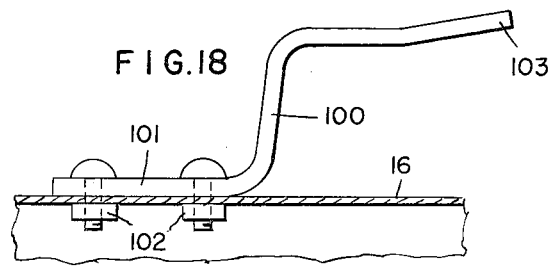
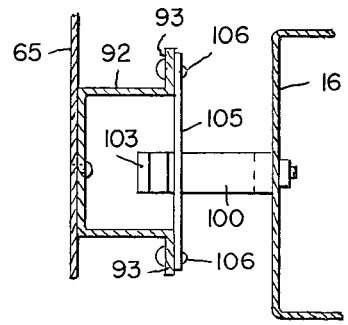
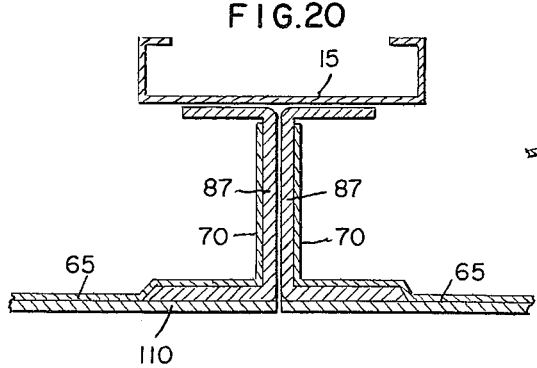
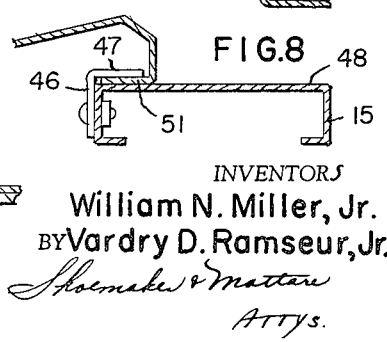
INVENTORS
William N. Miller, Jr.
BY Vardry D. Ramseur, Jr.
Shoemaker & Mattare
ATTYS.

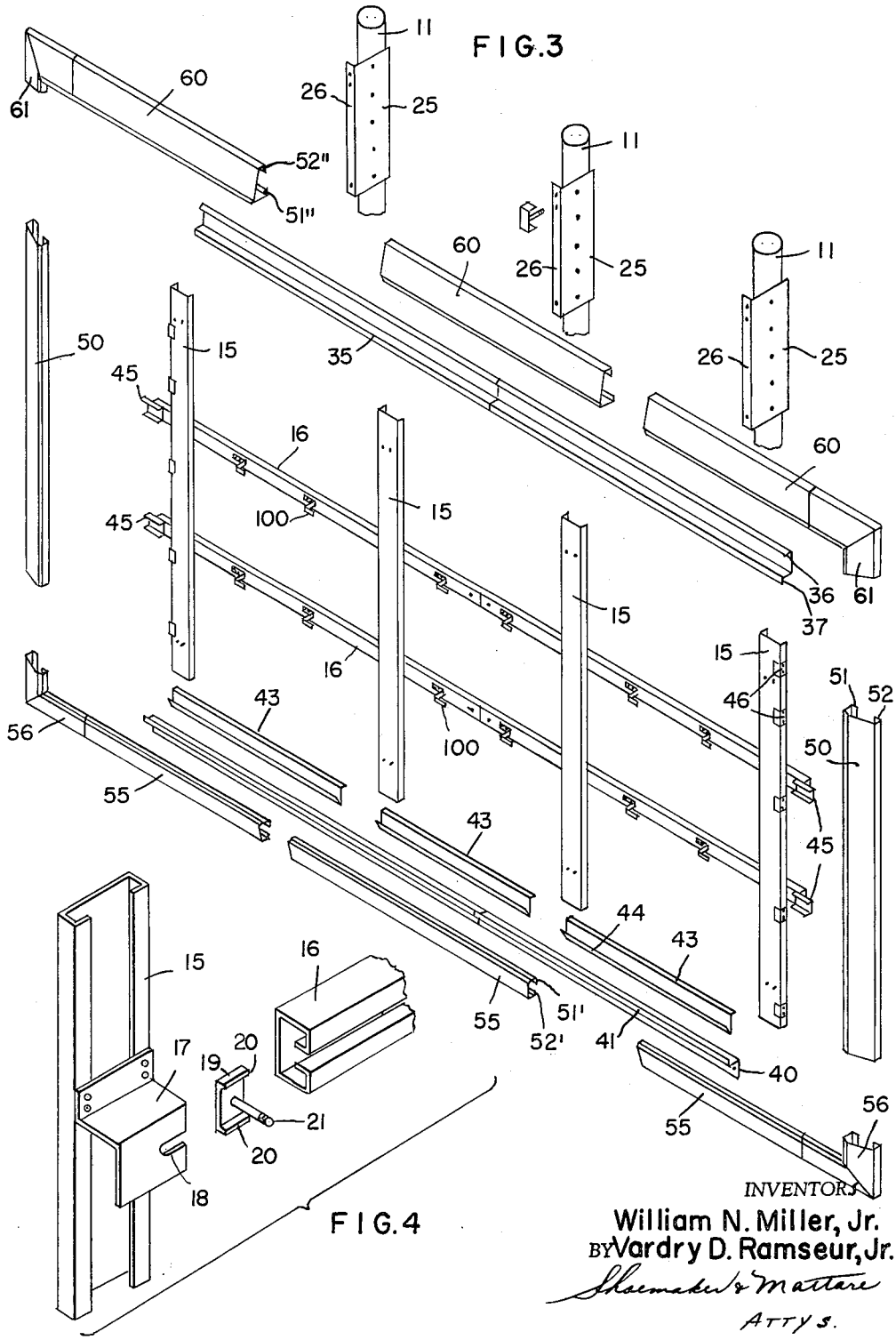

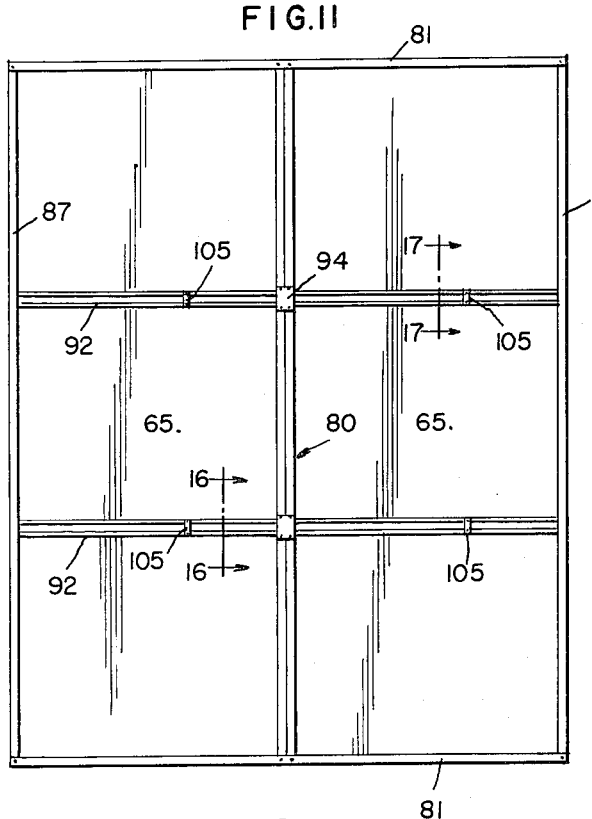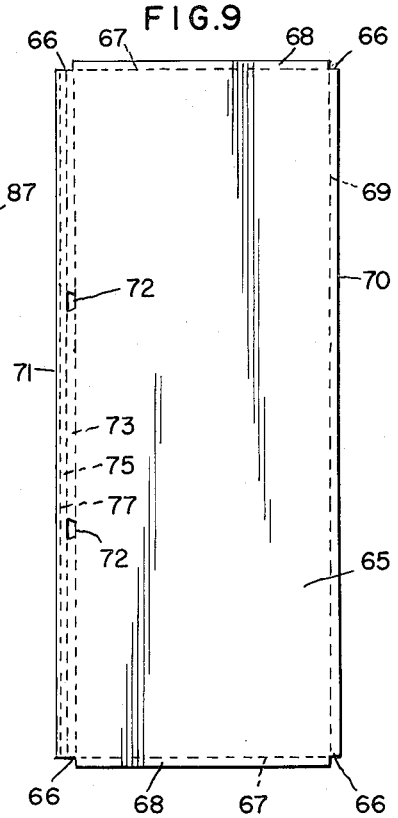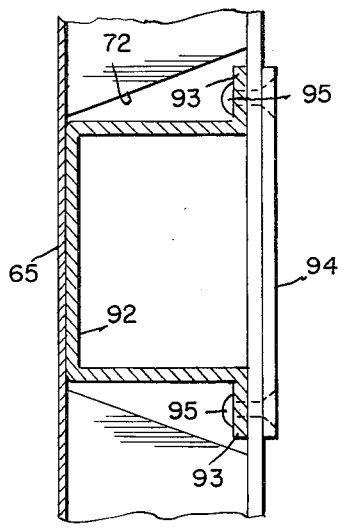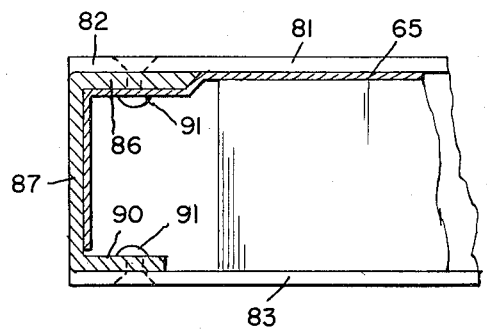

United States Patent Office 2,993,289
Patented July 25, 1961

1

2,993,289
BILLBOARD CONSTRUCTION
William N. Miller, Jr., and Vardry D. Ramseur, Jr., Greenville, S.C., assignors to Miller Outdoor Advertising Products Company, Inc., Greenville, S.C., a corporation of South Carolina
Filed Apr. 7, 1958, Ser. No. 726,883
9 Claims. (Cl. 40—125)

The present invention relates to a billboard construction and more particularly to a billboard structure of the type wherein a plurality of portable panels are mounted upon a suitable support structure.

It has been a common practice in the prior art to mount posters upon billboards wherever the billboard happens to be located. This method of posting is unsatisfactory for a number of reasons. Inclement weather often prevents the billboard from being posted when desired, and in addition the billboards are often situated in such a position that it is difficult for workmen to get into proper position for posting. Further problems arise in certain locations such as an elevated billboard over a parking lot or the like wherein the workmen must be extremely careful not to allow objects to drop upon cars or pedestrians who may be underneath the billboard.

It is, accordingly, desirable to provide an arrangement wherein the billboard may be posted entirely indoors at one central location, thereby eliminating the problems encountered with the old style billboards, and producing a very efficient and economical operation. The aforementioned advantages may be obtained by providing an arrangement wherein a strong billboard support structure is mounted at the desired location, and a plurality of separable panels may be mounted on or dismounted from the supporting structure as desired. When such portable panels are employed, the poster may be mounted upon the panels in the shop and subsequently assembled on the support structure such that the panels are adjacent one another and cooperate to provide the over-all picture of the poster.

It is apparent that the panels of the present invention are suited for receiving any desired type of advertising indicia. For example, the smooth display surfaces of the panels may be painted, embossed, or provided with various types of other advertising members which may extend out of the plane of the display surface such as to provide a third dimensional effect. As used herein, the term posting is intended to denote mounting of the advertising material of any type upon the display surface of the panels, and is not necessarily restricted to mounting posters on the panels.

In order for portable panels of this type to be successfully employed, it is necessary that they be as light weight as possible to enable workmen to easily carry them and mount them or dismount them. At the same time, the panels and also the supporting structure must be as rigid and strong as possible to withstand loads imposed thereon by the wind and other elements. The present invention employs portable panels constructed of a lightweight metallic material such as aluminum, which is ordinarily quite flexible but is arranged in a novel manner so as to provide sufficient strength and rigidity to withstand handling necessary to achieve its purpose. The supporting structure is so designed to accommodate the portable panels in a manner to provide the necessary strength and rigidity necessary to withstand the aforesaid elements. Efforts have been made in the prior art to construct portable panel billboards of aluminum or similar material, but these structures have proved to be unsatisfactory since the structural arrangement was excessively complex in order to provide the desired degree of rigidity and strength to the structure.

2

The supporting structure according to the present invention employs a simple arrangement wherein vertical and horizontal support members are fixed to one another to provide a rigid framework. Upper and lower rails are provided for supporting the portable panel, and trim members are supported about the supporting structure in a novel and expeditious manner, whereby a very simple and sturdy support structure is provided having pleasing appearance to the eye when in assembled position. The members of the supporting structure are assembled utilizing new and novel clamping devices that provide a quick and easy method of assembling the structure without the use of elaborate tools and other devices. Also the structure is easily and quickly disassembled for removal if necessary with complete salvage of all parts. The use of the new and novel clamping devices in the assembly of the structure provide maximum flexibility while retaining maximum strength.

The new and novel panel assemblies according to the present invention are each composed of a pair of separate sheets of thin light weight aluminum or similar flexible material. The sheets of aluminum have substantially normally extending flanges formed integral with each edge thereof, and adjacent flanges of the sheets are bent over so as to provide a central longitudinally extending stiffener means. End frame members and side frame members are secured to the sheets along the edges thereof and adjacent to the flanges, the frame members being secured to one another to provide a rigid frame around each panel assembly. Transverse stiffener members are connected to the sheets and are suitably disposed relative thereto so as to provide in cooperation with the longitudinally extending stiffener means a cross bracing of the sheets of aluminum, thereby providing them with the desired degree of rigidity. This novel construction according to the present invention is extremely simple and employs a minimum of components, and yet provides a very light weight and rigid construction.

An object of the present invention is to provide a new and novel billboard construction employing a plurality of portable panels permitting posting to be completely performed indoors.

Another object is the provision of a billboard construction of very light weight, and yet which is quite sturdy in construction.

A further object of the present invention is to provide a billboard construction wherein the number of components is reduced to a minimum, and which is simple and inexpensive in construction.

Yet another object of the present invention is the provision of a billboard construction employnig portable panels which may be quickly and easily mounted on or dismounted from the associated supporting structure.

A still further object of the invention is to provide a billboard construction whereby the advertising presented on a plurality of billboards may be rotated quickly and easily from one billboard to another to provide maximum coverage for the advertising.

Other objects and many attendant advantages of the invention will become more apparent when considered in connection with the accompanying specification and drawings wherein:

FIG. 1 is a front view of a billboard construction according to the present invention;

FIG. 2 is a view similar to FIG. 1 with the panel assemblies removed;

FIG. 3 is an exploded view illustrating the manner of assembly of the supporting structure;

FIG. 4 is an exploded view illustrating the manner in which the vertical support members of the support assembly are secured to horizontal support members;

FIG. 5 is a sectional view, taken along line 5—5 of FIG. 2, looking in the direction of the arrows;

FIG. 6 is a sectional view, taken on line 6—6 of FIG. 1, looking in the direction of the arrows;

FIG. 7 is a sectional view, taken on line 7—7 of FIG. 1, looking in the direction of the arrows;

FIG. 8 is a sectional view, taken on line 8—8 of FIG. 2, looking in the direction of the arrows;

FIG. 9 is a top view of a blank from which one of the sheets of the panel assembly is formed;

FIG. 10 is a front view of an assembled panel assembly according to the present invention;

FIG. 11 is a back view of the panel assembly shown in FIG. 10;

FIG. 12 is a sectional view, taken along line 12—12 of FIG. 10, looking in the direction of the arrows;

FIG. 13 is a sectional view, taken along line 13—13 of FIG. 10, looking in the direction of the arrows;

FIG. 14 is a sectional view, taken on line 14—14 of FIG. 10, looking in the direction of the arrows;

FIG. 15 is a sectional view, taken along line 15—15 of FIG. 10, looking in the direction of the arrows;

FIG. 16 is a sectional view, taken along line 16—16 of FIG. 11, looking in the direction of the arrows;

FIG. 17 is a sectional view, taken along line 17—17 of FIG. 11, looking in the direction of the arrows;

FIG. 18 is a sectional view, taken along line 18—18 of FIG. 2, looking in the direction of the arrows;

FIG. 19 is a sectional view, taken on line 19—19 of FIG. 1, looking in the direction of hte arrows; and FIG. 20 is a sectional view, taken along line 20—20 of FIG. 1, looking in the direction of the arrows.

Referring to FIG. 1 of the drawings, the billboard construction according to the present invention is illustrated and includes a support assembly indicated generally by reference numeral 10 supported upon three spaced posts 11 suitably secured in fixed position. A plurality of panel assemblies, which are illustrated as being three in number, are indicated by reference numeral 12, it being noted that the third right hand panel is partially broken away in this view. FIG. 2 illustrates the support structure with the panels removed, and referring to FIG. 3, the construction of the support panel may be clearly seen. A plurality of vertical support members 15 are of channel construction, and a pair of horizontal support members 16 are secured to the vertical support members in a manner which is most clearly seen in FIG. 4. An angle bracket 17 is secured to the vertical support members 15 and has a horizontally extending slot 18 formed therein. Channel shaped horizontal support members 16 are fitted within angle brackets 17 and securing members 19 have the leg portions 20 thereof disposed within the horizontal support member with the stud portion 21 thereof extending through the longitudinal slot in the horizontal support members and slot 18 in the angle brackets. A suitable nut is threaded on the outer threaded end of stud 21 to rigidly secure the vertical and horizontal support members together to provide a rigid frame. Each of posts 11 is provided with fastening brackets 25 having vertical flanges 26 disposed normally thereof. As seen most clearly in FIG. 5, each of the horizontal support members 16 is provided with a connector means 27 which is similar to connector means 19. A headed stud 28 is disposed through a central opening 28' provided in connector 27, the head of stud 28 being welded as at 29 to the connector member. Stud 28 extends through a suitable opening 30 formed in flange 26 of member 25, and a nut and washer assembly 31 is mounted on the outer end portion of the stud for securing the horizontal support members rigidly to the support posts 11.

A top rail 35 is secured by suitable nut and bolt assemblies to the upper portions of vertical support members 15, and includes a downwardly extending flange 36 defining a substantially U-shaped recess with the main body of the rail, and also includes an offset downwardly extending flange 37 for retaining the panels in proper operative position. Flanges 36 and 37 of the top rail 35 may be more clearly seen in FIG. 6 of the drawings. A bottom rail 40 is provided with an offset upwardly extending flange 41 as most clearly seen in FIG. 7 for retaining the lower portion of the panel assemblies, and horizontally extending portion 42 of the bottom rail supports the panel assemblies. Bottom rail 40 is secured by suitable nut and bolt assemblies to the lower portions of the vertical support member 15. Three trim clip members 43 are secured to the bottom rail and are disposed in the spaces defined between the vertical support members 15. An upwardly extending flange 44, as seen in FIG. 7, defines a substantially U-shaped recess with the main body portion of the trim clip members. First connector members 45 are secured at opposite end portions of the horizontal support 16 and are of generally U-shaped channel configuration. Second connector members 46, as seen most clearly in FIG. 8, are secured to the right and left hand vertical support members 15 and have a normally extending flange 47 spaced from the front surface 48 of the vertical support members.

Side trim members 50 have an irregular configuration as seen in FIG. 3, and are provided with inwardly directed flanges 51 and 52 for supporting the trim members in proper operative position. Flanges 51 of the side trim members are disposed in the space between flange 47 of the second connector members and the vertical supports 15 as seen most clearly in FIG. 8, and the opposite flanges 52 of the side trim members engage the back surface of first connector members 45 as seen in FIG. 3, thereby retaining the side trim members in position. Lower trim members 55 are three in number, the opposite end sections having a normally extending portion 56 extending upwardly for engaging the lower portion of side trim members 50. The lower trim members have the same general configuration as side trim members 50, and the flange 51' thereof corresponding to the flange 51 of members 50 is disposed within the U-shaped space defined by flanges 44 of the trim clip members 43 for supporting the lower trim members in operative position. The lower flange 52' of the lower trim members 55 corresponds to flange 52 of the members 50, and engages the rear portions of the lower ends of the vertical support members 15.

Upper trim members 60 are shown as being three in number, and the opposite end members have normally extending portions 61 adapted to engage the side trim members 50. The flanges 51" and 52" correspond to the flanges 51 and 52 of members 50, and flange 51''', as seen most clearly in FIG. 6, is disposed in a U-shaped space defined by the flange 36 of the top rail. The upper flange 52" of the upper trim members engages the rear portion of the vertical support members 15 for retaining the upper trim members in proper operative position. Each of the foregoing components is preferably constructed of aluminum or other light weight flexible material, and it is apparent that a light weight support assembly is provided of rigid and compact construction.

Referring to FIG. 9, a flat blank 65 is illustrated from which one of the pairs of sheets employed in each panel assembly is formed. Each of the corners of the panel is notched as at 66 and horizontal bend lines 67 extend between the notches at the top and bottom ends of the blank. Portions 68 are bent down to form normally extending flanges along the end edges of the finished sheet. A vertically extending bend line 69 extends along one side of the blank, and portion 70 is subsequently bent down to form a normally extending flange along the side edge of the finished sheet. Portion 71 at the opposite side of the blank, as seen in FIG. 9, is provided with two trapezoidal openings 72, and is bent downwardly along a bend line 73 to form a normally extending flange 74 which may be most clearly seen in FIG. 12. The blank is bent back along a second bend line 75 to form a portion 76 which extends substantially parallel to the main body portion of the sheet as seen in FIG. 12, and the blank is then bent back again along line 77 to form a portion 78 in abutting relationship with portion 76. When side edge flanges 74 are disposed adjacent one another as seen in FIG. 12, a longitudinal stiffener means is provided for the completed panel assembly which comprises a pair of sheets secured to one another. This longitudinal stiffener means of the completed panel assembly is indicated generally by reference numeral 80 in FIGS. 10 and 11 of the drawings. It is evident that the flanges 74 and portions 76 and 78 provide a rigid beam-like structure which will reinforce the center of the completed panel assembly.

A channel end frame member 81 of generally U-shaped cross-sectional configuration, as seen most clearly in FIG. 14, has legs 82 and 83, and is disposed in abutting relationship with the end edge flanges of the sheets 65, and serves to reinforce the end edges of the panel assembly. The opposite end portions of the longitudinally extending stiffener means 80 are secured to the adjacent leg of the end frame members 81 by suitable means, such as rivets or the like.

The longitudinally extending edge portions of the sheets 65 opposite to the abutting flanges 74 are provided with a longitudinally extending depressed portion 85 which is adapted to receive one leg 86 of an elongated side frame member 87 which is in abutting engagement with the side edge flange 70 of each of the sheets 65. It is noted that the leg 86 is provided with a tapered surface 88 which is complementary to the surface 89 on the sheet, thereby providing a substantially smooth surface between the sheet and the side frame members which is the posting surface of the panel assemblies. As seen most clearly in FIG. 15, the legs 82 and 83 of the end frame members are disposed a sufficient distance apart to receive the leg 86 and opposite leg 90 of the side frame members 87 therebetween. The adjacent end portions of the end frame members and side frame members and the corners of the sheets 65 are secured together by suitable connector means, such as rivets 91. In this manner the end frame members and side frame members are secured together to provide a rigid frame.

As seen most clearly in FIG. 16, transverse stiffener members 92 of generally channel shaped configuration are provided with laterally extending flanges 93, the opposite end portions of the transverse stiffener members 92 being disposed adjacent the side edge flanges 70 of the individual sheets of the panel assembly. As seen in FIG. 16, the transverse stiffeners 92 extend through the openings 72 provided in the abutting flanges 74 of the central stiffener means, and are secured to the adjacent portions 76 and 78 of the stiffener means by means of plates 94 which are secured to the portions 76 and 78 and flanges 93 by means of suitable securing means, such as rivets 95. As seen most clearly in FIG. 13, the opposite end portions of the transverse stiffeners 92 are provided with notches 96 for receiving the depressed edge portions of the sheets 65. The opposite end portions of the stiffeners 92 are secured to the adjacent legs 90 of the side frame members by means of suitable connectors, such as rivets, and each of the individual sheets is secured to the stiffeners 92 at a plurality of transversely spaced positions by means of suitable fasteners, such as rivets and indicated at 97 on FIG. 10 of the drawings.

Locking means is provided for locking the panel assemblies to the associated support structure, and as seen in FIGS. 2 and 18, each of the horizontal support members 16 is provided with a plurality of similar hook-shaped members 100, which, in the present instance, are six in number. Each of the hook-shaped members includes a portion 101 secured to the associated horizontal support member 16 by means of nut and bolt assemblies 102, and has an outwardly flared end portion 103 adapted to cooperate with a locking member secured to the panel assemblies. As seen in FIG. 11, each of the transverse stiffeners 92 is provided with a pair of locking members 105 disposed on either side of the central stiffener means 80. Referring now to FIGS. 17 and 19, each of the locking members 105 comprises a narrow strip of material which has the opposite end portions thereof secured to flanges 93 of stiffeners 92 by suitable means, such as rivets 106.

When it is desired to mount the panel assemblies upon the support structure, the first panel is inserted in the left hand portion of the structure as seen in FIG. 2 such that the lower surface of the panel assembly is supported upon the lower rail 40 and the upper portion of the panel assembly is retained by the upper rail 35. The panel is then slid to the left such that the locking members 105 of the panel assembly engage hooks 100 disposed on the horizontal support members, thereby locking the panel assemblies to the support structure. As seen most clearly in the upper left hand corner of FIG. 2 and in FIG. 6, a small plate 108 is secured to the top rail adjacent the upper left hand corner of the support structure for preventing the left hand panel assembly from tilting out of proper position when slid to the left to engage the hook members 100. The remaining panel assemblies may be mounted on the support structure in a similar manner. When the panel assemblies are so mounted, they are in abutting relationship with one another and present a smooth posted surface as seen in FIG. 20 of the drawings wherein a poster mounted upon the posting surface of the panel assembly is indicated by reference numeral 110. When it is desired to dismount the panel assemblies from the support structure, the right hand panel assembly is initially slid to the right and then lifted out of the bottom rail and then dropped away from the support structure to clear the upper rail. The remaining panel assemblies are removed in a similar manner.

It is apparent from the foregoing that there is provided a new and novel billboard construction comprising a plurality of portable panels which permits the posting operation to be performed completely indoors. The construction is extremely light yet rigid. The number of components of the apparatus has been reduced to a minimum and the device is simple and inexpensive in construction. The panel assemblies may be mounted on or dismounted from the associated support structure in an efficient and expeditious manner.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:
1. A billboard construction comprising a panel assembly including a pair of separate sheets of light weight flexible material, each of said sheets having substantially normally extending flanges at the side edge portions and the end edge portions thereof, the side edge flanges of one sheet being disposed adjacent the side edge flanges of the other sheet to define a longitudinally extending elongated central stiffener means, each of said sheets having a depressed portion adjacent the opposite side edge flanges of the sheets, a pair of side frame members secured to said sheets and abutting said opposite side edge flanges of the sheets, a pair of end frame members secured to said sheets and abutting the end edge flanges of the sheets, said frame members being connected to form a rigid frame, a pair of transverse stiffener mem- bers secured to said sheets and having the opposite end portions thereof disposed adjacent said opposite side edge flanges, said transverse stiffener members having a cut-out portion at said end portions for receiving the depressed portions of said sheets, and means for securing said panel assembly to an associated billboard support structure.

2. Apparatus as defined in claim 1 wherein each of said side frame members comprises a channel member of generally U-shaped cross-sectional configuration, one leg of each of said side frame members being disposed in the depressed portion of the associated sheet thereby providing a substantially smooth support surface for a poster mounted upon the panel assembly.

3. Apparatus as defined in claim 2 wherein each of said end frame members comprises a channel member of generally U-shaped cross-sectional configuration, the legs of said end frame members being spaced a sufficient distance to receive the associated side frame members therebetween, the means for connecting said frame members to form a rigid frame including rivets extending through the adjacent end portions of said frame members.

4. A billboard construction comprising a panel assembly including a pair of separate sheets of light weight flexible material, each of said sheets having substantially normally extending flanges at the side edge portions and the end edge portions thereof, the side edge flanges of one sheet being disposed adjacent the side edge flanges of the other sheet to define an elongated longitudinally extending central stiffener means, each of said stiffener side edge flanges including a portion bent inwardly substantially parallel to the main body portion of the associated sheet, said stiffener side edge flanges having aligned openings formed therethrough, a pair of side frame members secured to said sheets and abutting the opposite side edge flanges of the sheets, a pair of end frame members secured to said sheets and abutting the end edge flanges of the sheets, said frame members being connected to form a rigid frame, a pair of transverse stiffener members extending through said openings and being secured to said sheets, each of said transverse stiffener members being connected to said inwardly bent portions of said stiffener side edge flanges and means for securing said panel assembly to an associated billboard support structure.

5. A billboard construction comprising a panel assembly including a pair of separate sheets of light weight flexible material, each of said sheets having substantially normally extending flanges at the side edge portions and the end edge portions thereof, the side edge flanges of one sheet being disposed adjacent the side edge flanges of the other sheet to define a central longitudinally extending stiffener means, said stiffener means having openings formed therein, each of said sheets being provided with a longitudinally extending depressed portion adjacent the opposite side edge flanges thereof, a pair of channel side frame members of substantially U-shaped cross-sectional configuration abutting the opposite side edge flanges of the sheets and having one leg thereof disposed in said depressed portion of the associated sheet, a pair of channel end frame members of substantially U-shaped cross-sectional configuration abutting the end edge flanges of the sheets, the end portions of the legs of said end frame members being disposed in engagement with the outer surfaces of the legs of adjacent end portions of the side frame members, means connecting the adjacent end portions of said side frame members and said end frame members, a pair of transversely extending stiffener members projecting through said openings and having the opposite end portions thereof disposed adjacent the side frame members, each of said transverse stiffener members having a cut-out portion formed in one end thereof for receiving the depressed portion of the associated sheet, and means for securing said panel assembly to an associated billboard support structure.

6. A billboard construction comprising a panel assembly unit including a pair of separate sheets of lightweight flexible material, each of said sheets having substantially normally extending flanges at the side edge portions and the end edge portions thereof, the side edge flange of one sheet being disposed adjacent the side edge flange of the other sheet to define an elongated central stiffener means, a pair of side frame members, each of said side frame members being generally channel-shaped and including a pair of leg portions, each side frame member being disposed outwardly of and in abutting relationship with the side edge flange of the associated sheet, the legs of each side frame member extending inwardly of the sheet and in embracing relationship thereto, a pair of end frame members, each of said end frame members being generally channel-shaped and including a pair of leg portions, each of said end frame members spanning the end edge portions of said pair of sheets, each of said end frame members being disposed outwardly of and in abutting relationship with the end edge flange of the associated sheets, the legs of said end frame members extending inwardly of the end portions of the sheets and in embracing relationship thereto, the opposite end portions of said end frame members being connected to the end portions of said side frame members to form a rigid frame, at least one transverse stiffener means extending transversely of said first-mentioned stiffener means and secured to said sheets, and means for securing said panel assembly unit to an associated billboard support structure.

7. A billboard construction comprising a support assembly and a plurality of panel assemblies removably supported on said support assembly, each of said panel assemblies including a pair of separate sheets of light weight flexible material, longitudinal and transverse stiffener means connected to said sheets and to one another, frame members connected to provide a rigid frame along the edge portions of said sheets and secured to said sheets, said support assembly including a plurality of horizontal and vertical support members defining a rigid open framework of light weight construction, bottom rail and top rail members for supporting said panel assemblies on said support assembly, cooperative locking means on said support assembly and said panel assemblies for securing said panel assemblies to said support assembly, trim means supported by said support assembly and including side trim members, first connector members secured to the end portions of said horizontal support members, second connector members secured to the vertical support members, said first and second connector members engaging said side trim members to secure the side trim members in operative position, said trim means including bottom trim members, a plurality of trim clip members secured to said bottom rail members and including a generally U-shaped bottom portion, said bottom trim members having a flange portion disposed in said U-shaped bottom portion for supporting said bottom trim members in operative position.

8. A billboard construction including a support assembly adapted to support a plurality of panel assemblies thereon, said support assembly including a plurality of horizontal and vertical support members secured to one another and defining a rigid open framework of lightweight construction, a top rail member supported by said vertical support members adjacent the upper portion thereof, a bottom rail member supported by said vertical support members and spaced below said top rail member for supporting panel assemblies on said support assembly, locking members supported by said horizontal support members for engaging cooperating locking means on said panel assemblies, first connector members secured to the end portions of said horizontal support members, and second connector members connected to the outermost vertical support members, whereby said first and second connector members are adapted to support side trim members at the lateral portions of the support assembly, a plurality of clip members supported at the lower portion of said support assembly and being disposed in the spaces defined between said vertical support members, said clip members defining a substantially U-shaped recess for receiving a flange of a bottom trim member.

9. A billboard construction including a support assembly adapted to support a plurality of panel assemblies thereon, said support assembly including a plurality of horizontal and vertical support members secured to one another and defining a rigid open framework of lightweight construction, a top rail member supported by said vertical support members adjacent the upper portion thereof, a bottom rail member supported by said vertical support members and spaced below said top rail member for supporting panel assemblies on said support assembly, locking members supported by said horizontal support members for engaging cooperating locking means on said panel assemblies, first connector members secured to the end portions of said horizontal support members, and second connector members connected to the outermost vertical support members, whereby said first and second connector members are adapted to support side trim members at the lateral portions of the support assembly, said top rail including a downwardly extending flange defining a substantially U-shaped recess for receiving a flange of a top trim member.

References Cited in the file of this patent

UNITED STATES PATENTS

| | | |
|---|---|---|
| 1,167,221 | Rice | Jan. 4, 1916 |
| 1,407,548 | Knouff | Feb. 21, 1922 |
| 1,781,558 | Speck | Nov. 11, 1930 |
| 1,853,141 | Overholtz | Apr. 12, 1932 |
| 1,860,919 | Ansel | May 31, 1932 |
| 1,886,899 | Overholtz | Nov. 8, 1932 |
| 2,194,367 | Petzold | Mar. 19, 1940 |
| 2,775,833 | Wishart | Jan. 1, 1957 |